United States Patent

[11] 3,542,236

| [72] | Inventor | Rene Dru<br>7 rue du Boccador, Paris, France |
|---|---|---|
| [21] | Appl. No. | 787,930 |
| [22] | Filed | Dec. 30, 1968 |
| [45] | Patented | Nov. 24, 1970 |
| [32] | Priority | Jan. 3, 1968, Dec. 9, 1968 |
| [33] | | France |
| [31] | | 134,743 and 177,280 |

[54] CONTAINER EQUIPPED WITH TWO SUPERPOSED COVERS AND DETACHABLE HANDLE
9 Claims, 10 Drawing Figs.

[52] U.S. Cl. .................................................. 220/29,
220/23, 220/85, 220/94; 294/27
[51] Int. Cl. ...................................................... B65d 51/18
[50] Field of Search ............................................ 206/4, 65K;
220/23, 23.6, 8, 97, 94, 85; 294/27T

[56] References Cited
FOREIGN PATENTS
372,024  5/1932  Great Britain ................ 206/4

Primary Examiner—George T. Hall
Attorney—Holcombe, Wetherill & Brisebois

ABSTRACT: A container comprising a main cover, an auxiliary cover adapted to be carried by said container on a seat one above said main cover, and a detachable handle adapted to be stored in the space between said covers and attached to said container after removal of said covers. The handle is provided with means facilitating the removal of the auxiliary cover and its attachment to the container.

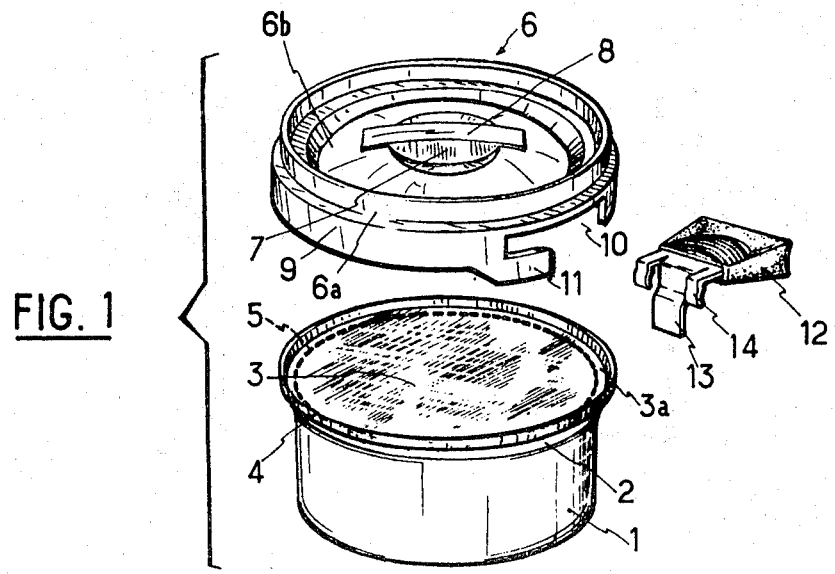
FIG. 1
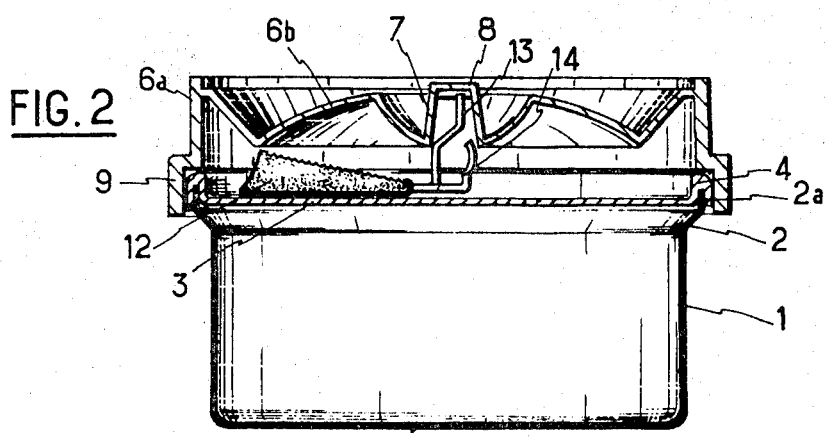
FIG. 2
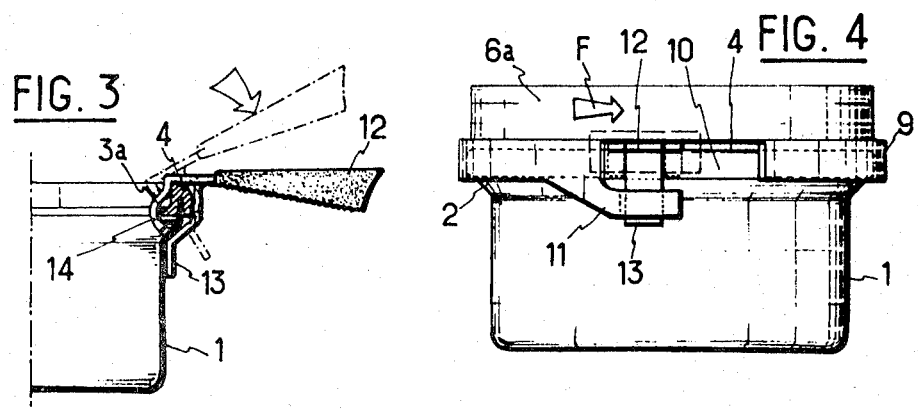
FIG. 3
FIG. 4

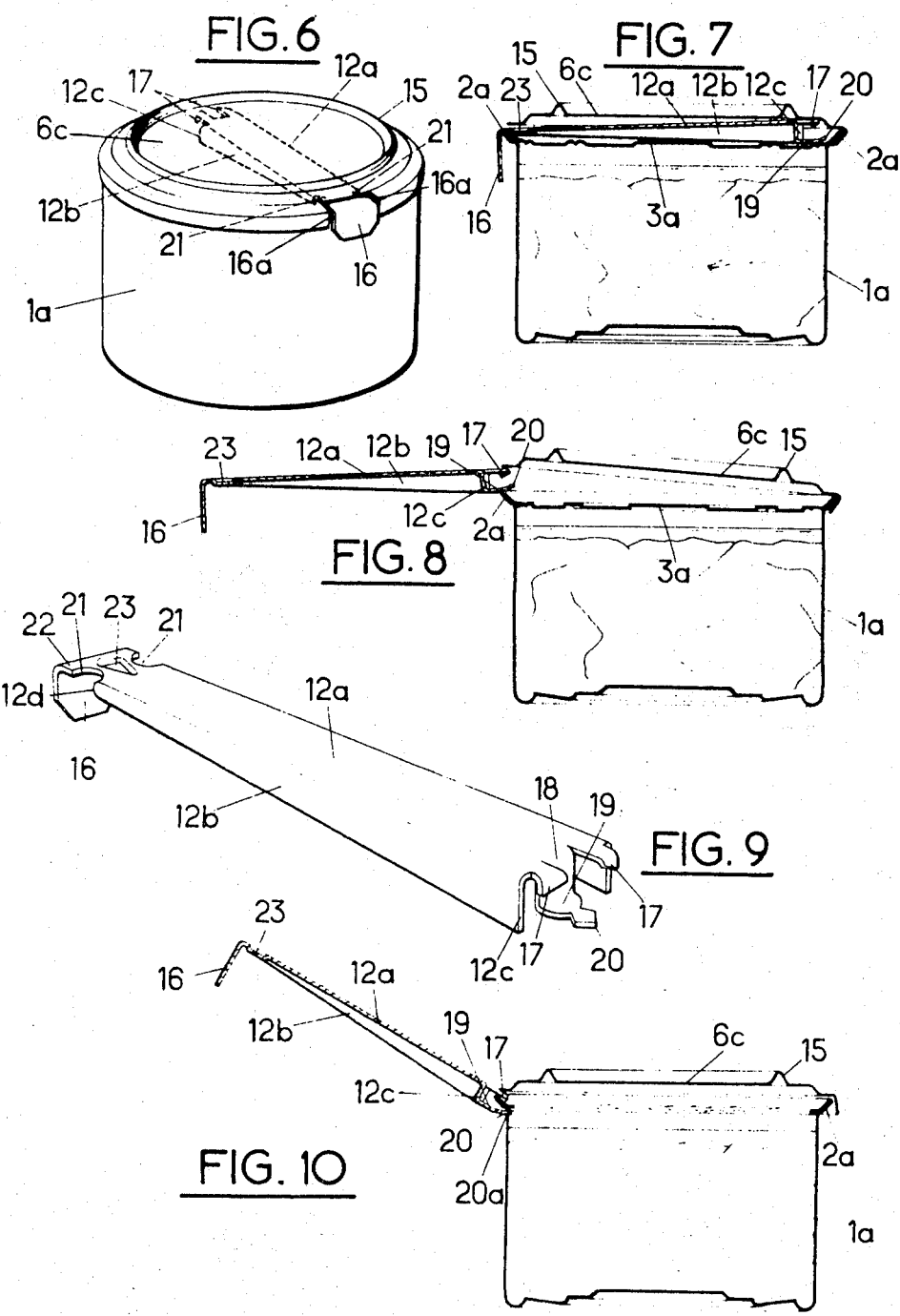

CONTAINER EQUIPPED WITH TWO SUPERPOSED COVERS AND DETACHABLE HANDLE

SUMMARY OF THE INVENTION

This invention relates to an auxiliary cover and or more demountable handles adapted to be removably applied to a container for holding preserves or the like, over its conventional top, or to be substituted for said conventional top after the container has been opened and the handle or handles attached thereto, so as to protect and retain the contents of the container until they are to be eaten.

Of course, the invention also comprises in combination a container for preserves or the like, an auxiliary cover, and the said removable handle or handles.

In a preferred embodiment of the invention, the said auxiliary cover may be fitted into a seat provided at the top of the container. The handle carries at its inner end a curved tip and extends to the outside of the auxiliary cover through a notch provided in the cover for that purpose. The handle is thicker at its outer end than at its inner end or at the part passing through the notch, so that when the auxiliary cover is in place the outer end of the handle is gripped between the two covers, and the auxiliary cover may be automatically displaced by pulling on the tip of the handle.

In this embodiment, the handle also comprises at its thicker end a sharply pointed projection and a pair of hooks. The arrangement is such that when the hooks are caught over the edge of the container, the handle may be swung so as to cause the pointed projection to pierce the wall of the container immediately below the seat for the cover, thereby fastening the handle to the container.

In order that the characteristic features of the invention may be better understood, several embodiments thereof will now be described purely by way of illustration and example with reference to the accompanying drawings, in which:

FIG. 1 is an exploded perspective view showing the cover according to the invention and a container of the type with which it is adapted to be used;

FIG. 2 is a front view, partially in section, showing the container of FIG. 1 equipped with an auxiliary cover according to the invention;

FIG. 3 is a detail view showing how the removable handle is fastened to the container after it has been opened;

FIG. 4 shows the container, equipped with its removable handle and auxiliary cover, in elevation;

FIG. 6 is a perspective view showing a container equipped with an auxiliary cover of a type different from the one shown in FIGS. 1 to 5, and showing the position of a handle which may be used as means for automatically removing the auxiliary cover;

FIG. 7 is a diametrical-sectional view through the container of FIG. 6, showing the position of the handle of FIG. 6 when stored in the open space between the two covers on the container;

FIG. 8 is also a diametrical-sectional view showing how the auxiliary cover is removed;

FIG. 9 is a perspective view of the handle shown in FIGS. 6 to 8; and

FIG. 10 is a diametrical section through the same container, showing how the handle is attached to the container by resting the hooks at its inner end on the upper part of the seat provided for the cover and piercing the lateral wall of the container above said seat.

Figure 5:
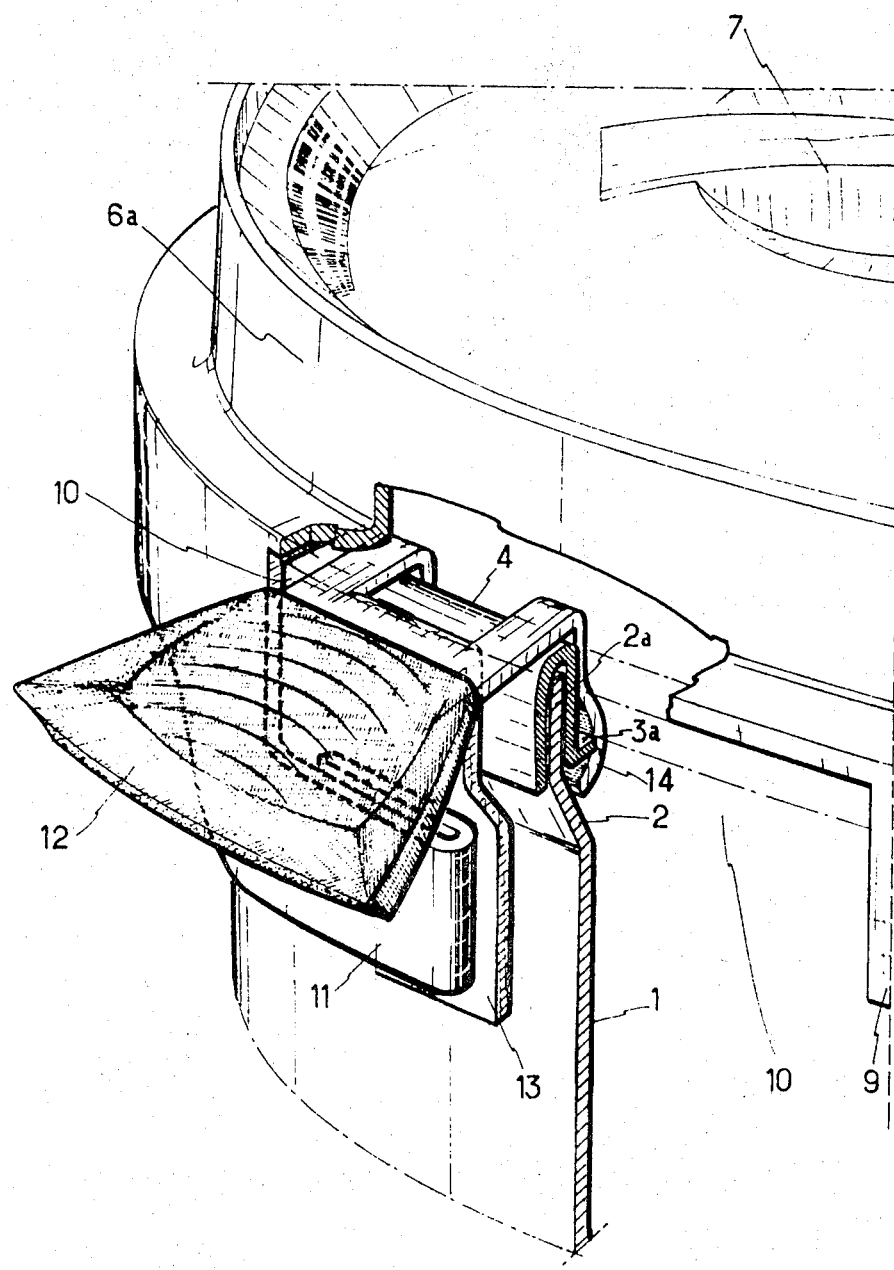
FIG. 5 is a fragmentary view, on an enlarged scale with part of the container broken away, to more clearly show how the handle is fastened to the container.

Referring now to the drawings, and particularly to FIG. 1, reference numeral 1 indicates a metallic container for preserves or the like, which is cylindrical in form, and which is slightly widened at the top, as shown at 2. The free edge of the container acts as a seat for the flat cover 3 sealed to the container at 4, in any suitable way. The broken line 5 is the line along which the cover 3 will be cut when it is removed to open the container, by means of a conventional can-opener or any other suitable means which may be incorporated into the cover.

It is the combination of this container, or any other similar container with the auxiliary cover hereinbefore described, and equipped with one or more removable handles, which constitutes the essence of the invention. In the embodiment shown, such a cover considered as a whole, is designated by reference numeral 6. It comprises a collar or skirt 6a integral with a domed part 6b provided with a central, part-spherical recess 7 crossed by a hollow transverse bar 8, which serves as a handle.

The skirt 6a carries a rim 9 having a slightly larger diameter, pierced by a notch 10 bounded at its lower edge by a projection 11, the function of which will be hereinafter described.

In accordance with the present invention, the cover is associated with a small handle 12, which is preferably made of a heat insulating material, and provided with flexible projections 13 and 14 of unequal length, preferably curved, which form a sort of resilient clamp.

The above-described container 1, or any like container, may be sold to the public covered by the above-described auxiliary cover, the handle 12, 13, 14 having been loosely enclosed in the hollow space between the normal cover 3, which is then intact with its flexible projections 13 and 14 engaging and preferably resiliently retained in the hollow bar 8 (FIG. 2).

When the container 1 is to be opened, either in order to eat its contents cold, or to heat them, the auxiliary cover 6 is removed by simply lifting it up, and the handle 12, 13, 14, (FIG. 1) withdrawn. The cover 3 is than cut along the line 5 to afford access to the contents of the container, by removing the disk within said line. The handle 12, 13, 14 is then mounted on the upper edge of the container.

This is accomplished by inserting the lip 4 between the flexible projections 13 and 14 (FIGS. 3 and 5) so that the projection 14 is resiliently hooked over the narrow ledge 3a (FIGS. 1, 3 and 5) at the base of the rim 4, after removal of the disk 3.

At the same time, the projection 13 engages both the outer face of the seat 4 and that of the widened portion 2, as well as against the upper part of the container adjacent that ledge.

The handle 12, 13, 14, is thus firmly attached, as shown in FIG. 3. The user may then easily move the container to heat it on a dish-warmer or the like, and may subsequently move it after it has been heated, without danger of being burned.

As will be readily understood, the container may be moved while either uncovered (FIG. 3) or covered by its auxiliary cover (FIGS. 4 and 5). In this case, after mounting the handle as hereinbefore described, the skirt 9 of the cover is slipped onto the seat 4, while taking care to position the handle 12 and flexible projection 13 in alignment with the opening in the slot 10.

The cover 6 is then turned slightly in the direction indicated by the arrow F (FIG. 4) so that the projection 11 rests resiliently on the projection 13 and fastens the assembly together. The cover may be removed by turning it in the opposite direction.

In the second embodiment shown in FIG. 6, it will be seen that the container 1a carries an auxiliary cover 6c provided with a circular ridge 15 which facilitates its subsequent use after the container has been opened and the normal cover 3a replaced, especially in order to keep the contents of the container hot, when they have been heated.

The handle of the container is shown in broken lines at 12a in FIG. 6. This handle is provided at its outer end with a small hook 16, bent at right angles to the handle, by means of which the cover may be unseated, as previously mentioned.

At the other end of the handle 12a are two hooks 17 which may be rested on the upper edge of the inner seat 2a of the container 1a, as will be hereinafter described in connection with FIG. 9.

The distance between the cover 6c and the cover 3a is such that the surfaces 18 and 12c of the handle 12a are practically immobilized in the positions shown in FIGS. 6 and 7, with the hook 16 passing through a notch 16a in the cover 6c.

The hook 18 carries a horizontal projection 19 which terminates in a pointed tip 20 adapted to pierce the container wall below its seat 2a at any point such as the point 20a FIG. 10.

Referring now to FIG. 8, it will be seen that by pulling on the hook 16, the thickness of the handle 12a, which increases from the hook 16 toward the hook 18, will lift and unseat the cover 6c, as shown in FIG. 8.

Referring now to FIG. 10, it will be seen that by using the seat 2a as a fulcrum, the handle 12a may be swung so as to cause the tip 20 to penetrate the wall of the container at the point 20a just below the seat 2a, thus fastening the handle to the container.

FIG. 10 also shows the notched auxiliary cover 6c, replaced on the upper part of the seat 2a, with the sides of said notch embracing the lateral sides 12b of the handle 12a.

It will of course be appreciated that the first embodiment hereinbefore described has been given purely by way of example and may be modified as to detail without thereby departing from the basic principles of the invention. Thus, for example, the cover 6 may have two notches 10 diametrically opposite each other, and two corresponding handles to facilitate manipulating of the container.

In like manner, the second embodiment may be modified as to detail and certain components thereof replaced by their mechanical equivalents, without thereby departing from the basic principles of the invention.

In particular, it will be noted that in FIGS. 6 and 9 the handle 12a carries at its outer end, near the hook 16, two notches 21 which separate the lateral edges 12b of the handle from its end 22, which rests on the seat 2a.

Between these notches 21 is a boss 23 shaped like an isosceles triangle pointed inward. This boss insures that the handle 12a will be lifted over the seat 2a when the hook 16 is pulled, so that the outer edge 12d of the lateral edges 12b do not catch on the inside of said seat.

I claim:

1. An auxiliary cover for a container having a main cover, said auxiliary cover comprising: a rim for temporarily fastening it to said container above said main cover, while maintaining a space between said covers adapted to receive a removable handle for said container, and said cover rim being provided with a notch adapted to fit over said handle so that said cover may also be mounted on said container when said handle is attached to the rim of the container.

2. In combination a cover as claimed in claim 1, a container adapted to receive said cover, and a removable handle adapted to fit between said covers, said handle comprising means for fastening it to the rim of said container at any point along said rim.

3. The combination claimed in claim 2 in which said handle comprises flexible means at one end for gripping an edge of said container and said auxiliary cover has a peripheral skirt terminating in a rim of larger diameter, said rim being provided with a notch partially closed along its lower edge by a protuberance adapted to retain said flexible gripping means when said gripping means has been applied to said container edge and said auxiliary cover mounted on said container with said handle extending through said notch.

4. The combination claimed in claim 3 in which said gripping means comprises a pair of flexible projections on one end of said handle adapted to engage one side of the rim of said container while a third flexible projection on said handle engages its other side.

5. The combination claimed in claim 4 in which said auxiliary cover is provided with a hollow handle in the form of a channel which opens downwardly and receives the gripping means on said container handle when said container handle is positioned between said covers.

6. The combination claimed in claim 2 in which said container is formed with a seat on which said auxiliary cover is frictionally retained, said cover being formed with a depending skirt which engages said seat and a notch in said skirt through which said container handle projects the outer end of said handle being bent at a right angle and the thickness of said handle increasing from its outer end toward a maximum at its inner end which is greater than the depth of the space between the edge portions of said covers so that said auxiliary cover is lifted off said container when said handle is pulled outwardly.

7. The combination claimed in claim 6 in which the inner end of said handle carries two hooks adapted to catch over an edge of said container, and a punch between said hooks positioned to penetrate a wall of said container when said hooks are caught over a container edge and said handle is swung downwardly, thereby attaching said handle to said container.

8. The combination claimed in claim 6 in which said handle carries near its outer end a triangular boss one side parallel to the bent position of said handle, and spaced therefrom by a distance substantially equal to the radial width of the seat for said cover.

9. The combination claimed in claim 8 in which the height of said boss is substantially equal to that of the two lateral edge portions of said handle, which edge portions are bent at right angles to the longitudinally central portion of said handle, and said lateral edge portions are provided with notches adjacent said boss, which notches receive the upper edge of the seat for said auxiliary cover when said handle is positioned between said covers.